A. H. NEULAND.
MAGNETO.
APPLICATION FILED JULY 21, 1913. RENEWED JAN. 29, 1917.
1,221,208.
Patented Apr. 3, 1917.
5 SHEETS—SHEET 1.
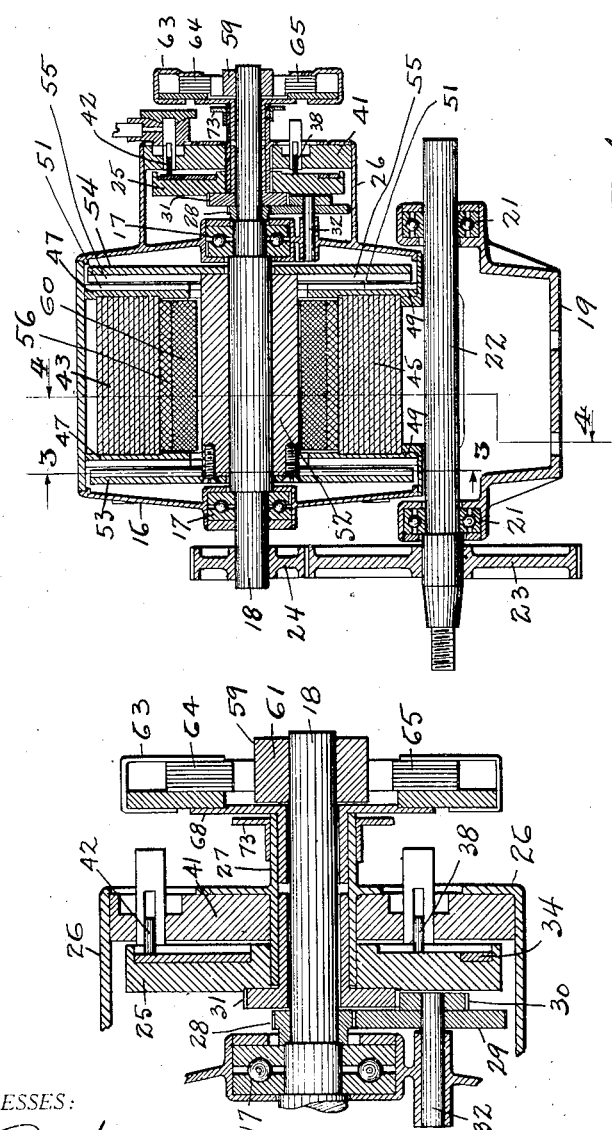
WITNESSES:
INVENTOR.
A. H. NEULAND
BY Miller &White
his ATTORNEYS.

A. H. NEULAND.
MAGNETO.
APPLICATION FILED JULY 21, 1913. RENEWED JAN. 29, 1917.
1,221,208.
Patented Apr. 3, 1917.
5 SHEETS—SHEET 2.
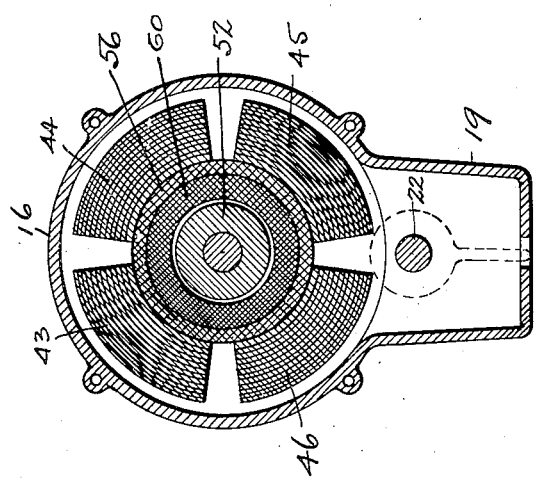
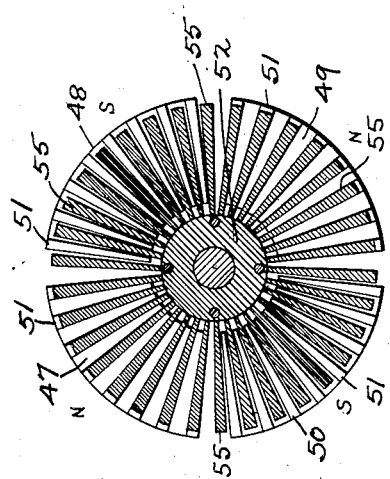
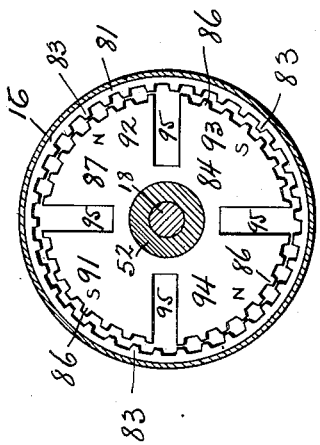
WITNESSES:
INVENTOR.
A. H. NEULAND
BY
his ATTORNEYS.

A. H. NEULAND.
MAGNETO.
APPLICATION FILED JULY 21, 1913. RENEWED JAN. 29, 1917.

1,221,208.

Patented Apr. 3, 1917.
5 SHEETS—SHEET 3.

WITNESSES:
H. G. Prost.
J. B. Gardner

INVENTOR.
A. H. NEULAND
BY Miller & White
his ATTORNEYS.

A. H. NEULAND.
MAGNETO.
APPLICATION FILED JULY 21, 1913. RENEWED JAN. 29, 1917.
1,221,208.
Patented Apr. 3, 1917.
5 SHEETS—SHEET 4.
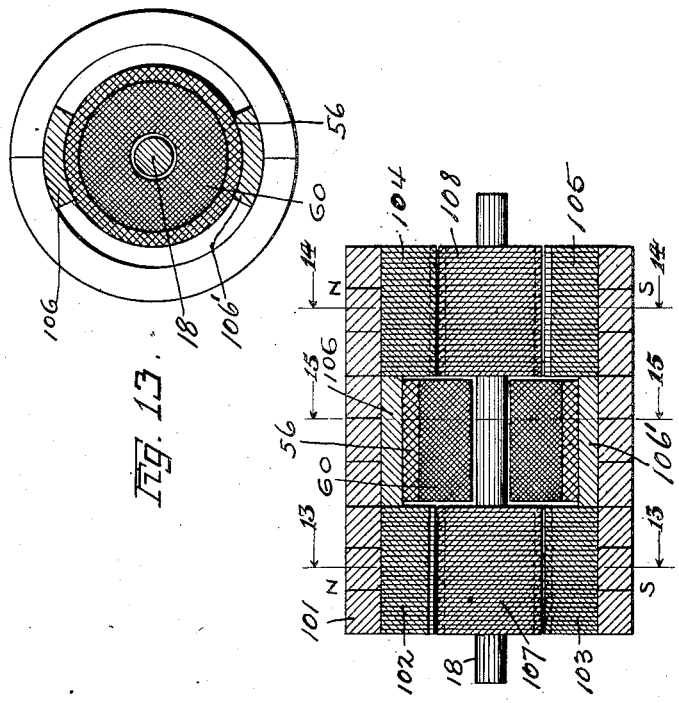
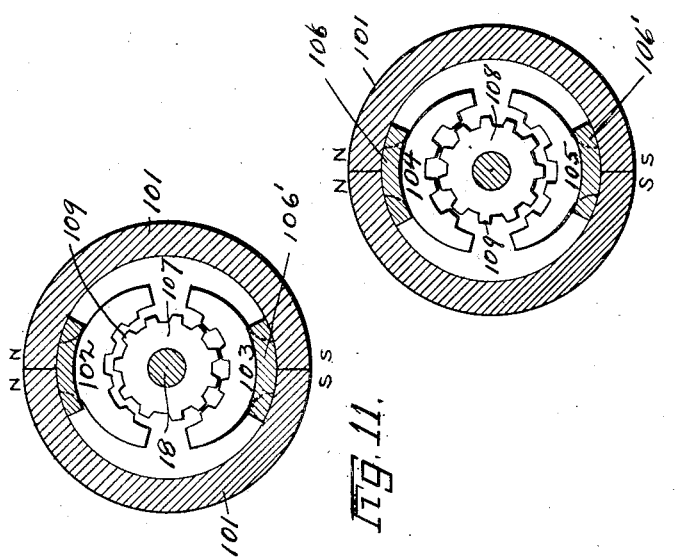
WITNESSES:
INVENTOR.
A. H. NEULAND
BY Miller & White
his ATTORNEYS.

A. H. NEULAND.
MAGNETO.
APPLICATION FILED JULY 21, 1913. RENEWED JAN. 29, 1917.
1,221,208.
Patented Apr. 3, 1917.
5 SHEETS—SHEET 5.
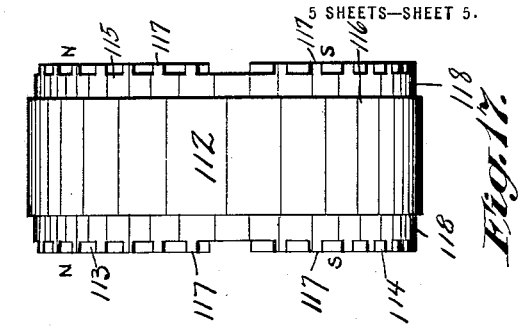
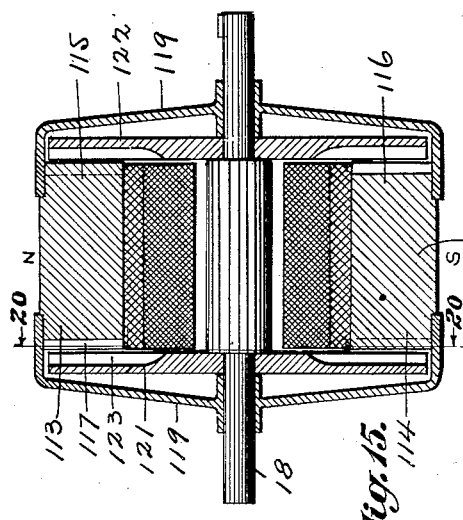
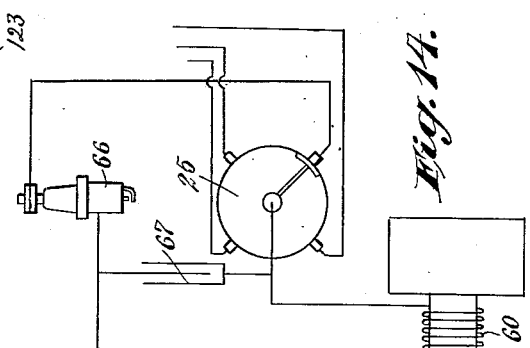
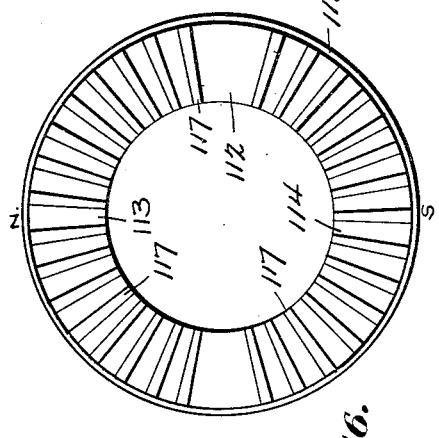
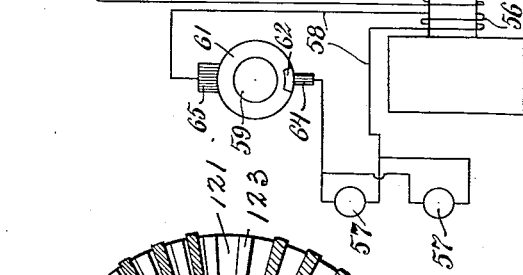
WITNESSES:
INVENTOR.
A. H. NEULAND
BY Miller & White
his ATTORNEYS.

UNITED STATES PATENT OFFICE.

ALFONS H. NEULAND, OF SAN FRANCISCO, CALIFORNIA, ASSIGNOR TO NEULAND MAGNETO COMPANY, OF SAN FRANCISCO, CALIFORNIA, A CORPORATION OF CALIFORNIA.

MAGNETO.

1,221,208.  Specification of Letters Patent.  Patented Apr. 3, 1917.

Application filed July 21, 1913, Serial No. 780,133. Renewed January 29, 1917. Serial No. 145,305.

*To all whom it may concern:*

Be it known that I, ALFONS H. NEULAND, a subject of the Czar of Russia, and a resident of the city and county of San Francisco, State of California, have invented certain new and useful Improvements in Magnetos, of which the following is a specification.

The invention relates to magnetos which are generally used in connection with internal combustion engines to generate the electric current for producing the firing spark.

An object of the invention is to provide a magneto which will generate a high potential per revolution at all speeds of revolution.

Another object of the invention is to produce a high tension magneto of substantially the same size as the magnetos now in general use, which is capable of producing the desired spark and current for illumination purposes.

Another object of the invention is to provide a magneto which produces a high tension current in the ignition circuit and a low tension current in the lighting circuit.

Another object of the invention is to provide a magneto in which the total magnetic flux is reversed through a stationary high tension coil a plurality of times for each revolution of the revolving element.

A further object of the invention is to eliminate the use of the breaker in the ignition circuit.

A further object of the invention is to provide means in combination with the magneto for producing a proper distribution of the current to the spark plugs and illuminating circuit.

The invention possesses other objects and advantageous features, which with the foregoing, will be set forth at length in the following description, where I shall outline in full that form of the invention which I have selected for illustration in the drawings accompanying and forming part of the present specification. The novelty of the invention will be included in the claims succeeding said description. From this it will be apparent that I do not limit myself to the showing made by such drawings and description, as I may adopt many variations within the scope of my invention as set forth in said claims.

Referring to the drawings:

Figure 1 is a vertical longitudinal section through one type of the magneto of my invention.

Fig. 2 is a vertical longitudinal section on a larger scale of the distributer and diverter.

Fig. 3 is a cross-section of the magneto taken on the line 3—3, Fig. 1.

Fig. 4 is a cross-section of the magneto taken on the line 4—4, Fig. 1.

Fig. 6 is a cross-section of the type shown in Fig. 5 taken on the line 6—6.

Fig. 10 is a longitudinal section of another type of magneto, the surrounding frame being omitted.

Fig. 11 is a section taken on the line 13—13 Fig. 10.

Fig. 12 is a section taken on the line 14—14 Fig. 10.

Fig. 13 is a section taken on the line 15—15 Fig. 10.

Fig. 14 is a diagrammatic representation of the lighting and ignition circuits and the means for controlling the current in said circuits, only one branch of the ignition circuit being shown completed.

Fig. 15 is a longitudinal section of another type of magneto.

Fig. 16 is an end view of the magnet employed in the magneto shown in Fig. 15.

Fig. 17 is a side view of the magnet.

Fig. 18 is a section taken through the line 20—20 Fig. 15.

Figure 5:
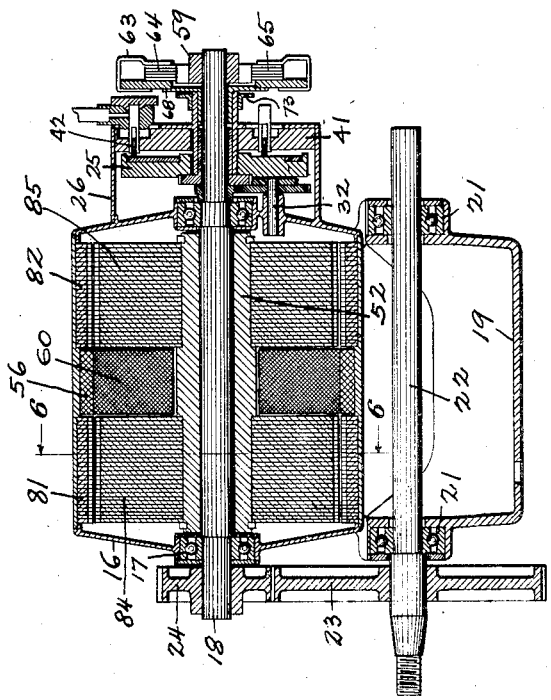
Fig. 5 is a vertical longitudinal section of another type of my invention.
Figure 9:
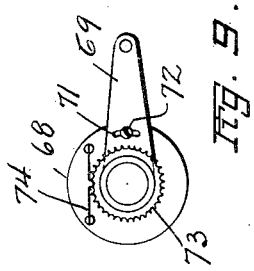
Fig. 9 is a detail of the mechanism for controlling the position of the diverter and timer.
Figures 7, 8:
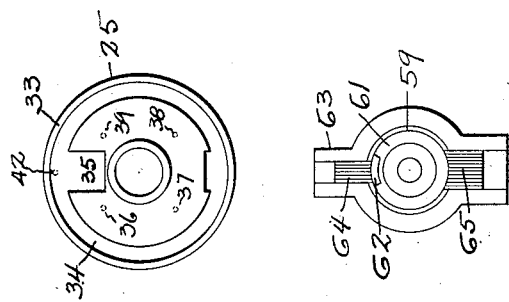
Fig. 7 is an end view of the distributer showing the position of the brushes.
Fig. 8 is an end view of the diverter and timer.

It is the present tendency in automobile practice to provide the vehicle with a complete electric light equipment and heretofore it has been necessary to have a generator or battery for this purpose, besides employing a separate magneto for producing the required ignition current. The magneto of my invention is of an entirely distinct type from those now on the market, which on account of the high frequency of the generated current is capable of providing the required ignition and also providing sufficient current to illuminate the electric lamps on the car, while being of substantially the same size as magnetos now in general use. On account of the high frequency and the fact that the ignition spark is of very short duration, only a comparatively few cycles of the current are necessary for the ignition, allowing the remaining cycles to be used for illuminating purposes. The magneto is not to be considered, therefore, as the ordinary magneto which produces the ignition alone, because by the employment of my construction a new result is obtained, namely, the production of a high frequency current. Magnetos are now in use which produce a current of one cycle per revolution of the magneto shaft, but the magneto of my invention is adapted to produce a much greater number of cycles, that shown in the drawings operating to produce a current of thirty-four cycles per revolution. I am aware that the magneto will operate to produce the desired results when generating a current of less than thirty-four cycles per revolution, in fact, it will be operative as low as four cycles per revolution. Each cycle requires two reversals of the magnetic flux through the coil for its production, making eight reversals for four cycles.

Each type of magneto illustrated is preferably provided with two stationary coils surrounding the shaft thereof, and with the same distributing and commutating mechanisms, the difference being in the arrangement of the current generating means. Each type is provided with a suitable frame or housing 16 which incloses the magneto and provides a support for the bearings 17 of the magneto shaft 18. The magneto is provided with a base 19, so that the present magneto may be readily substituted for others, without changing the design of the support therefore, or may be readily attached to any support. The base 19 provides a support for the bearings 21 of the countershaft 22 which is connected to the pump shaft or cam shaft or other suitable rotating part of the internal combustion engine, which parts or shafts usually rotate at the same speed as the crank shaft. In the present construction the magneto shaft is connected to the counter-shaft 22 by means of the gears 23—24, so that it rotates at twice the speed of the counter-shaft.

The distributer 25 is arranged within the casing 26 and is loosely mounted for rotation upon the sleeve 27 which preferably forms part of the casing 26. The proper speed of rotation of the distributer with relation to the speed of the engine is obtained by means of the gears 28—29—30 and 31. Gear 28 is secured to the magneto shaft and meshes with gear 29 which is loosely mounted on the stub-shaft 32. Secured to gear 29 is gear 30 which is in mesh with gear 31 which is attached to the distributer. The proportions of these various gears are such that the distributer makes one complete revolution for each two complete revolutions of the crank shaft of the engine. The distributer is designed to operate in conjunction with a four cylinder, four cycle engine, but it is evident that its construction may be varied to suit other forms of engines.

The distributer consists preferably of the fiber or hard rubber drum 33 in which is inserted a metal ring 34 having a radial offset 35, which comes in contact successively with the brushes 36—37—38—39 arranged in the holding disk 41. From each of these brushes a conductor extends to one of the spark plugs of the engine. The brush 42 connected to the generating coil of the magneto contacts continuously with the metallic ring 34.

In the construction shown in Figs. 1, 3 and 4, I employ four permanent magnets 43—44—45—46 arranged in quadrature and firmly held in place in the frame. The magnets are arranged so that the corresponding ends of the successive magnets are of opposite polarity, thereby presenting at each end of the magneto two north poles and two south poles, the like poles occurring diametrically opposite each other. Secured to ends of the magnets and holding them in place in the frame are sector shaped plates 47—48—49—50 corresponding in shape to the cross section of each magnet. As far as the passage of the magnetic flux is concerned, these sector shaped plates may be considered as the faces of the magnets and are magnetized in the same direction as the contacting ends of the magnets, that is, at each end of the magneto there are two positively magnetized plates and two negatively magnetized plates. Each plate is provided with a plurality of radially extending teeth 51, all of the teeth being of the same size and pitch. The plates are spaced apart circumferentially so that an air gap is provided between the ends of the successive magnets. The end teeth on the adjacent ends of two adjacent plates are spaced apart from each other, from center to center a distance equal to one-half a tooth pitch, or an odd multiple of one-half the tooth pitch, for reasons which will hereinafter appear.

Fixed on the magneto shaft is a core 52 to which are attached at the opposite ends the plates or disks 53—54 which lie adjacent to and rotate in a plane parallel with the plane of the plates 47—48—49—50. These disks 53—54 are provided on their faces adjacent the plates 47, 48, 49, 50 with radially extending teeth 55, spaced evenly circumferentially and of the same pitch as the teeth on any of the poles 47, 48, 49, 50. These disks 53—54 operate to open and close the various magnetic circuits, and thereby cause a reversal of the flux through the core 52, and may be termed rotors.

It is evident from the arrangement of the teeth on the pole-pieces 47, 48, 49, 50 and on the rotors, that when the teeth on the rotors are coincident with or in juxtaposition with the teeth on two pole-pieces of the same sign, they are staggered with relation to the teeth on the pole-pieces of the opposite sign. The two rotors are arranged on the core in such manner that when the teeth of rotor 53 are coincident with the teeth on one end of one magnet, the teeth on rotor 54 are coincident with the teeth on the opposite end of the same magnet. It is evident therefore, that for each movement of the rotors a distance of one-half tooth pitch, the direction of the flux through the core is reversed. In the construction shown in Fig. 1 there are thirty-four teeth on the rotor, so that for each revolution of the magneto shaft, sixty-eight reversals of the flux through the core are obtained.

The magnets 43—44—45—46 are spaced from the core 52 so that a large space surrounding the core is available for the winding, thereby permitting a large number of suitably insulated turns in the winding, and consequently the generation of a high tension current. The high tension coil 60 is suitably arranged in the space and is spaced slightly from the core 52 so that it remains stationary. On account of the large number of reversals of flux per revolution, in the present instance there being sixty-eight, and since the duration of the spark used for ignition is of short duration, it is evident that it is necessary to employ only a small number of the impulses generated in the coil for sparking purposes.

The high tension current generated is not generally suitable for illuminating electric lamps which operate at a comparatively low voltage, and when it is desirable to use the magneto as a source of supply for lighting a low tension winding 56 of fewer turns of heavier wire may be arranged adjacent the high tension coil. The low tension coil is connected to the electric lamps 57 (Fig. 14) through the circuit 58 in which is arranged the diverter and timer 59, which operates to open the lighting circuit at the proper time to cause sparking in the cylinder. The diverter and timer 59 is mounted on the magneto shaft 18 and revolves at four times the speed of the distributer. The diverter and timer consists of a metallic drum 61 having an insert 62 of insulating material arranged therein which operates to open the lighting circuit, once for each revolution of the magneto shaft. Contacting with the face of the drum and supported in a suitable holder 63 are the brushes 64—65 which are suitably insulated from each other. The brush 64 is made narrower than the insulation insert 62, and the brush 65 is made wider than the insert so that the circuit is broken but once for each revolution of the drum. The diversion of the generated energy from the lighting circuit to the ignition circuit and vice versa is accomplished as follows: The number of turns in the high tension coil is chosen so as to cause the reversing flux to generate a sufficient potential difference to break down the air gap of the spark plugs when the lighting circuit is opened. The low tension winding is proportional to possess a reactance such that the potential difference on open circuit is a number of times (say five times) greater than when connected to the lights. Therefore, when the diverter closes the lighting circuit, the potential difference in the low tension coil as well as in the high tension coil drops to a fraction of its open circuit value with the result that there is not sufficient potential in the high tension circuit to force the current across the gap in the spark plug. The voltage in the low tension coil also drops to that required by the lights.

On account of the rapid reversals of the flux, the potential generated in the high tension winding is great, thereby eliminating the necessity of a breaker as commonly employed in magnetos of the present type.

Since the time of sparking is controlled by the time of opening of the low tension circuit, it is evident that the timing of the spark may be varied by varying the position of the brushes 64—65. This is accomplished by making the brush holder 63 movable circumferentially to vary the time of opening of the lighting circuit. Attached to the brush holder is a plate 68 to which is pivoted at the center the arm 69, which is connected to the spark control lever. The arm is provided with an elongated slot 71 engaging a screw 72 in the plate 68 so that the arm has a slight movement independent of the plate. In order to prevent sparking at the small diverter brush as the circuit is broken, the opening of the circuit should be coincident with the instant of substantially no voltage in the circuit, or at the instant that the electromotive force curve crosses the zero axis. In the present construction in which there are sixty-eight reversals of the flux or sixty-eight electromotive force impulses, for each revolution of the magneto shaft, it is evident that there are sixty-eight positions of the brush holder at which no sparking will occur. In order to insure the positioning of the brushes in one of these positions I have provided the fixed disk 73 provided with a plurality of indentations, and have arranged on the plate 68 a spring 74 having a bent portion adapted to seat in one of the indentations. It is evident that as the arm 69 is moved, it moves the brush holder a sufficient distance to allow the hump on the spring to spring into the next indentation. The slotted connection between the arm and plate 68 allows the plate to spring forward to occupy the position designated by the adjacent indentation. Since there are sixty-eight reversals of the current the disk 73 may be provided with sixty-eight indentations allowing sixty-eight adjustments, or it may be provided with thirty-four indentations, one for each cycle, or with a lesser number.

In the circuits shown in Fig. 14 I have indicated the low tension coil connected directly to two lamps, but it is evident that a greater number of lamps may be employed, and that switches may be provided for controlling the various lamps. It is also evident that a storage battery consisting of a rectifying cell and storage cells may be suitably connected to the lighting circuit, so that the battery may be charging when the engine is running and the lights are not in use, and may be discharging when the lights are in use and the engine is not running.

The magneto shown in Figs. 5 and 6 is a type which gives the same results as that heretofore described. The rotors consist of the two stationary laminated cylinders 81—82 having regularly spaced teeth 83 on their inner surfaces, which extend parallel to the axis of the magneto shaft. The magnets consist of two laminated cylinders 84—85 mounted upon the core 52, and provided on their outer surfaces with teeth 86, arranged parallel to the teeth 83. Each lamination consists of a plate 87 divided into four sectors 91—92—93—94 by slots 95, and the successive sectors are magnetized in opposite directions. The spacing of the teeth on the sectors and the position of the teeth on one sector with regard to the other is the same as has been hereinbefore set forth. The high and low tension coils are stationary and are arranged between the two rotors and between the two groups of magnets 84—85.

In the construction shown in Figs. 10 and 13 inclusive the magnets 101 are stationary and are arranged so that the north ends abut at one end and the south ends at the other. The magnets are preferably made semicircular in form and are assembled to form a cylinder. Arranged within the cylinder at the opposite ends thereof are the laminated pole-pieces 102—103—104—105. It is evident that these pole-pieces and magnets may be formed of integral laminations instead of separately when desired. The pole-pieces 102 and 104 adjoining the north poles of the magnets are positive poles and the pole-pieces 103 and 105 adjoining the south poles of the magnets are negative poles. The pole-pieces are toothed as hereinbefore described, the teeth on pole-piece 102 being alined with the teeth on pole-piece 104, and the teeth on pole-piece 103 being alined with the teeth on pole-piece 105. The teeth on each pole-piece are regularly spaced, and the end teeth on the adjacent ends of two pole-pieces are spaced apart, from center to center, a distance equal to an odd multiple of one-half the tooth pitch. The faces of the teeth lie in a curved plane concentric with the axis of the magneto shaft. Arranged between the two sets of pole-pieces 102—103 and 104—105 and adjacent the magnets are the conducting bars 106 and 106'. The high tension and low tension windings which are stationary are arranged between the rotors and encircle the magneto shaft. Mounted on the magneto shaft are the rotors 107—108 provided on their circumferential faces with regularly spaced teeth 109 of the same pitch as the teeth on the pole-pieces. The rotors are alined with the pole-pieces and are arranged on the shaft so that the teeth on one rotor are alined with the slots on the other, that is, one rotor is one-half tooth pitch in advance of the other. When the teeth on rotor 107 are coincident with the teeth on pole-piece 102, the teeth on rotor 108 are alined with the teeth on pole-piece 105, and the rotor teeth are staggered with relation to the teeth on the other pole-pieces. The magnetic circuit is, therefore, completed between the magnets, the pole-piece 102, flux valve 107, the magneto shaft, rotor 108, pole-piece 105 and the conducting core 106, the flux passing from left to right through the coils. A rotation of the rotors through a distance equal to one-half tooth pitch brings the rotor teeth in juxtaposition with the teeth on pole-pieces 104—103 causing the flux to pass in the opposite direction. It is evident that the same result can be obtained by alining the teeth on the two rotors and advancing the teeth on pole-pieces 104 and 105 one-half tooth pitch with respect to the teeth on pole-pieces 102 and 103.

In Figs. 15 to 18 inclusive I have illustrated another type of magneto which is simpler and cheaper of construction than those heretofore described. The magnet 112 is formed in one piece in the shape of a ring and is magnetized to produce a north and south pole on each face. The poles 113—114—115—116 are each provided with a plurality of radially extending teeth 117, the teeth being of the same pitch and the adjacent teeth on two poles being spaced apart a distance equal to an odd multiple of one-half the tooth pitch as has been hereinbefore set forth. The magnet is provided with annular depressed portions 118 adjacent the faces, onto which the caps 119 forming the magneto frame are pressed. The magneto shaft 118 bears in these caps and has secured thereto the rotors 121—122 having teeth 123 adapted to coincide alternately with the teeth on the poles. Poles 113 and 115 are positive poles and poles 114 and 116 are negative poles, and the rotors are so arranged with relation to the teeth on the poles, so that when the teeth on rotor 121 are alined with the teeth on pole-piece 113, the teeth on rotor 122 are alined with the teeth on pole-piece 116. In this position the teeth on the rotors are staggered with relation to the teeth on poles 114 and 115. The flux, therefore, passes from pole 113 through the shaft 18 to pole 116 and back through the magnet, causing the flux to pass through the coils 56 and 60 from left to right. A rotation of the rotors a distance of one-half tooth pitch brings the teeth on the rotors into coincidence with the teeth on pole-pieces 114 and 115, producing a flux through the coils from right to left. The flux is, therefore, reversed through the coils, once for each movement of a half tooth pitch, or twice for each tooth pitch. In the present drawings I have shown the rotors provided with thirty-four teeth each, thereby producing sixty-eight impulses in the coil for each revolution of the magneto shaft. The types of magnetos shown in the drawings permit of the production of a high tension ignition current by direct induction, by alternating a magnetic flux at a very high rate through a coil of many turns situated on the magneto itself, which coil is of circular shape and lends itself to thorough insulation. On account of the high rate of change of the flux through the coil, the generated electromotive force is great, thereby causing the elimination of the breaker which is ordinarily employed. Furthermore, on account of the high frequency, timing within any desired limits may be obtained without in the least decreasing the intensity of the spark. Besides these advantages the magneto also produces sufficient current to illuminate the electric lamps simultaneously with producing the proper ignition in the engine.

I claim:

1. In a magneto, the combination of a plurality of circumferentially arranged toothed pole pieces arranged in pairs, the pairs being spaced apart longitudinally, circumferentially arranged magnets spanning from one pair of longitudinally spaced pole-pieces to the circumferentially adjacent pair, a rotatable shaft, a toothed rotor on said shaft, rotation of the rotor serving to shift the flux from the magnets from one pole-piece to a longitudinally adjacent pole-piece, whereby the reluctance of the flux path is maintained substantially constant and the flux parallel to the shaft is reversed and a coil arranged to be traversed by said reversing flux.

2. In a high tension, high frequency magneto, a plurality of permanent magnets having toothed pole-pieces, a rotor having a plurality of teeth adapted to move relatively to the pole-pieces in a plane adjacent said toothed pole-pieces, each successive pole-piece being of opposite polarity to the immediately preceding pole-piece and the teeth on the pole-pieces and on the rotor being arranged so that the rotor teeth are coincident successively with the teeth on the successive pole-pieces.

3. In a magneto, a plurality of magnets having circumferentially spaced toothed pole-pieces, pairs of said pole-pieces of opposite sign being spaced apart longitudinally, a toothed rotor arranged in the plane of each pole-piece pair arranged to rotate relatively to the pole-pieces, the teeth on the pole-pieces and rotors being arranged so that the teeth on each rotor coincide alternately with the teeth on the pole-pieces of each pair, so that when the teeth on one rotor coincide with the teeth on a pole-piece in one pair of one sign, the teeth on the other rotor coincide with the teeth on a pole-piece of opposite sign in the other pair, and a coil arranged intermediate the pole-pieces.

4. In a magneto, a plurality of permanent magnets producing a magnetic flux, toothed pole pieces on said magnets, a revoluble shaft arranged within said magnets, toothed rotors secured to said shaft, the teeth on the rotors being so arranged with relation to the teeth on the pole pieces that a plurality of successive teeth on each rotor are alined with a plurality of successive pole piece teeth and a plurality of successive teeth on each rotor are staggered with a plurality of successive pole piece teeth, the teeth being so arranged that rotation of the rotors serves to reverse the direction of the flux through said shaft and a coil surrounding the shaft at that part in which the flux is reversed.

5. In a magneto, a permanent magnet producing a magnetic flux, two toothed pole-pieces at each pole of said magnet, the pole-pieces of opposite sign occurring in the same plane, and the planes of the two poles being spaced apart longitudinally, a rotatable shaft arranged concentrically with respect to said pole-pieces, means for reversing the direction of the flux longitudinally through said shaft, and a coil surrounding said shaft and arranged between the planes of the two poles.

6. In a magneto, a permanent magnet producing a magnetic flux, two toothed pole-pieces at each pole of said magnet pole-pieces of opposite sign occurring in the same plane and the planes of the two poles being spaced apart longitudinally, a rotatable shaft arranged concentrically with respect to said pole-pieces, toothed rotors on said shaft, rotation of said rotors serving to reverse the direction of the flux longitudinally through said shaft, and a coil surrounding said shaft and arranged between the planes of the two poles.

7. In a magneto, a permanent magnet producing a magnetic flux, two toothed pole-pieces at each pole of said magnet, pole-pieces of opposite sign occurring in the same plane, and the planes of the two poles being spaced apart longitudinally, a rotatable shaft arranged concentrically with respect to said pole-pieces, toothed rotors on said shaft said rotors being arranged so that when the teeth of one rotor are alined with the teeth on a pole-piece of one polarity in one pole plane, the teeth on the other rotor are alined with the teeth of a pole-piece of opposite polarity in the other pole plane, rotation of said rotors serving to reverse the direction of the flux through said shaft, and a coil surrounding said shaft and arranged between said pole planes.

8. In a magneto, a plurality of magnets arranged with their like-poles adjacent, toothed pole-pieces at opposite ends of said magnets, there being two pole-pieces of the same polarity at each end, a toothed two-part rotor arranged concentrically with the pole pieces, each rotor part facing one positive and one negative pole-piece, a shaft on which said rotor is mounted, the teeth on the rotor being so arranged with respect to the teeth on the pole-pieces, that a rotation of the shaft will cause the flux to be reversed longitudinally through the shaft, and a coil surrounding said shaft and arranged between the two parts of the rotor.

9. In a dynamo electric machine, a two-part toothed rotor, the two parts being magnetically connected, at least one pair of toothed pole-pieces surrounding each rotor part, the pole-pieces of each pair lying in a plane perpendicular to the axis of rotation of the rotor, magnets associated with said pole-pieces, and a coil arranged between the pairs of pole-pieces, rotation of the rotors serving to produce an alternation of the flux through said coil.

10. In a dynamo electric machine, a two part toothed rotor, the two parts being magnetically connected, a pair of toothed pole-pieces surrounding each rotor part, the pole-pieces of each pair lying in a plane perpendicular to the axis of rotation of the rotor, magnets associated with said pole-pieces, said pole-piece pairs being magnetically connected, and a stationary coil arranged between the pole-piece pairs, the arrangement of the teeth on the rotor parts and pole-pieces being such that a rotation of the rotors causes an alternation of the magnetic flux through said coil.

11. In a magneto, a circumferentially arranged magnet producing a magnetic flux, two longitudinally separated magnetically connected toothed pole pieces at each pole of said magnet establishing two longitudinally spaced planes of pole-pieces, each plane including at least one pair of pole-pieces, the circumferentially adjacent pole-pieces being of opposite polarity, a two-part magnetically connected toothed rotor opposing said pole pieces, movement of the rotor relative to the pole-pieces serving to shift the magnetic flux of the magnets from one pole piece to a longitudinally adjacent pole-piece, whereby the magnetic flux is reversed in a path parallel to the axis of rotation of the rotor without substantially changing the reluctance of the magnetic path, and a coil surrounding the path of the alternating flux.

In testimony whereof, I have hereunto set my hand at San Francisco, California, this 15th day of July 1913.

ALFONS H. NEULAND.

In presence of—
  H. G. Prost,
  M. Le Conte.